United States Patent [19]

Black

[11] 4,038,821
[45] Aug. 2, 1977

[54] FLUID CURRENT MOTOR

[76] Inventor: Jerimiah B. Black, 2065 Church Creek Drive, Charleston, S.C. 29407

[21] Appl. No.: 657,460

[22] Filed: Feb. 12, 1976

[51] Int. Cl.$^2$ ............................ F03B 7/00; F03B 9/00
[52] U.S. Cl. .................................... 60/398; 415/7; 415/8; 416/23; 416/85; 416/117
[58] Field of Search .................. 415/5, 7, 8; 60/398, 60/495, 496; 417/334, 336; 290/53, 54; 416/9, 23, 24, 84–86, 110, 117, 142, 143

[56] References Cited

U.S. PATENT DOCUMENTS

| 830,917 | 9/1906 | McNeil | 415/7 |
| 950,676 | 3/1910 | Price | 415/7 |
| 3,973,864 | 8/1976 | Atherton | 415/8 |

Primary Examiner—Allen M. Ostrager
Attorney, Agent, or Firm—Wigman & Cohen

[57] ABSTRACT

A fluid current motor adapted to extract energy from flowing natural currents is disclosed wherein a wheel-like frame is rotatably mounted about a vertical axis. The frame is positioned over a flowing water current, such as a stream, river, or the like, and is provided with a plurality of radial arms or spokes each of which is fitted with an articulated knuckle intermediate its length. At the outer extremity of each spoke there is mounted a yoke which pivotally supports a fluid reaction blade journaled intermediate its height in its associated yoke. Each yoke and blade assembly is buoyantly supported on the surface of the water by a pair of pontoons which maintain the blade at the same depth relative to the water surface regardless of variations in the level of the flowing water current. The reaction blades are provided at their vertical sides with hydrodynamic surfaces to effect more rapid pivoting of the blades into their vertically-oriented operative position and into their horizontal, feathered or inoperative position.

14 Claims, 4 Drawing Figures

FLUID CURRENT MOTOR

BACKGROUND OF THE INVENTION

This invention relates to new and useful improvements in fluid current motors for harnessing the energy of natural currents, and more particularly to a fixed water motor installation for transforming the energy of flowing tidal currents and the like into a useable rotational force and for storing any excess energy generated by the motor.

Fluid current motors have long been known in the art and are exemplified by the devices disclosed in U.S. Pat. Nos. 15,970; 34,600; 113,586; and 863,033. Such devices typically employ a plurality of horizontally pivotable blades or buckets suspended from a wheel-like frame which is rotatably mounted about a vertical axis. The frame is positioned so that the blades are substantially submerged to a predetermined depth below a given water level. The blades are provided on one side thereof with stops to resist the pivoting force exerted by the water current in one direction to thus maintain the blades in a vertical position. The reaction of the flowing current on the vertical planar surface of the blades produces rotation of the motor frame thereby converting the kinetic energy of the flowing current to rotational energy. Upon rotation of the frame to expose the other side of the blade to the current, the blades are free to pivot and, under the force of the current, eventually assume a substantially horizontal or "feathered" position to minimize resistance to the flow of water thereover.

Vertical adjustment of blade depth according to the level of the flowing water current is provided in the fluid motor disclosed in U.S. Pat. No. 34,600 by means of a chain which is used to manually raise and lower an adjustable hub upon which the blades are supported.

In general, the fluid motors of the aforementioned prior art devices are provided with pivotable blades of substantially planar construction, or, as shown in U.S. Pat. No. 863,033, they may have forwardly curved edges to form bucket-like members. Each of the blades or buckets of the prior art devices must present a reaction surface area on the opposite side of the blade to the flow of current so as to actuate the pivoting of the blade from its vertical or operative position to its feathered or inoperative position and vice versa. The force required to cause such pivoting produces a significant rotational force counter to the normal direction of rotation of the fluid motor and, consequently, reduces the fluid motor efficiency.

SUMMARY OF THE INVENTION

The present invention provides a novel fluid motor for extracting power from natural water currents which has an improved operating efficiency, which is capable of substantially unattended operation for long periods of time and which is constructed to automatically compensate for variation in the level of water current. It is, therefore, a primary object of the present invention to provide an efficient, relatively economically constructed and operated fluid motor for harnessing the energy of a flowing natural current of water.

More particularly, it is an object of this invention to provide a fluid current motor having a plurality of pivotable reaction blades which are hydrodynamically shaped to more efficiently produce energy from a flowing current of water.

Still more particularly, it is an object of this invention to provide a fluid current motor which includes a plurality of fluid reaction blades having hydrodynamic planing surfaces at the edges thereof to more rapidly urge the blades from their vertical to their horizontal positions and vice versa, to thus minimize the counter-rotational force exerted by such blades during rotation of the motor.

Another object of this invention is to provide a fluid current motor which includes means for mechanically storing the excess energy generated thereby, and which may be advantageously used from time to time, such as during slack water.

A further object of the present invention is to provide a fluid current motor having a plurality of fluid reaction blades, each buoyantly mounted at the end of an articulated spoke for automatically compensating for variations in the level of water of the flowing current.

Yet another object of this invention is to provide a fluid current motor characterized by simplicity of construction and ease of maintainance.

Another object of this invention is to provide a fluid current motor which is operative to extract energy from a flowing water current regardless of the direction of flow.

Briefly described, these and other objects of the invention are accomplished by providing a fluid current motor comprising a vertical shaft rotatably mounted in the bed of a flowing current of water. Affixed to the shaft is a hub having a plurality of radially extending rigid spokes affixed thereto and disposed at a point well above high water, each spoke being articulated intermediately thereof. At the outward end of the articulated portion of each spoke there is pivotally mounted a yoke which is supported on the water surface means of buoyant floats disposed at opposite ends of the yoke. Each yoke is provided with a substantially planar fluid reaction blade pivotally mounted thereto in a manner to rotate about a horizontal axis located approximately at the mid-point of the blade height. Stops are provided on the yoke which permit pivoting of the blade in one direction to its feathered position and prevent pivoting of the blade in the other direction to maintain the blade in its vertical or operative position. The articulated portions of the spoke permit the buoyant blade and yoke assemblies to automatically adjust to the rise and fall of the water level of the flowing current which is particularly advantageous in the case of flowing tidal currents.

At the vertical side edges of the lower portion of each blade there are provided hydrodynamic surfaces which are arranged at an inclination to the planar blade surface. The hydrodynamic surfaces of each blade are operative when the blade and its respective spoke are approximately aligned with the direction of current flow either (1) on the downstream side of the fluid motor to urge the blade from its vertical to its feathered position or (2) on the upstream side of the fluid motor to urge the blade from its feathered position to its vertical position.

The rotational output of the fluid motor is transmitted by a suitable gearing arrangement to a utilization device, such as an electrical generator and is used to store mechanical energy in a spring motor of the type disclosed in my copending U.S. patent application, Ser. No. 517,237, filed Oct. 23, 1974, now U.S. Pat. No. 3,945,453. The spring motor may be utilized to provide additional power to the utilization device, for example, during high load conditions of during periods of slack tide should the fluid motor be used in conjunction with tidal currents. Although not limited thereby, it is contemplated that the fluid current motor of this invention have a diametrical dimension on the order of 195 feet and that each reaction blade have a working surface area of approximately 240 square feet.

With these and other objects, advantages and features of the invention that may become hereinafter apparent, the nature of this invention may be more clearly understood by reference to the following detailed description of the invention the appended claims and to the several views illustrated in the attached drawings wherein;

DETAILED DESCRIPTION OF THE PREFERRED EMBODIMENT

Figure 1:
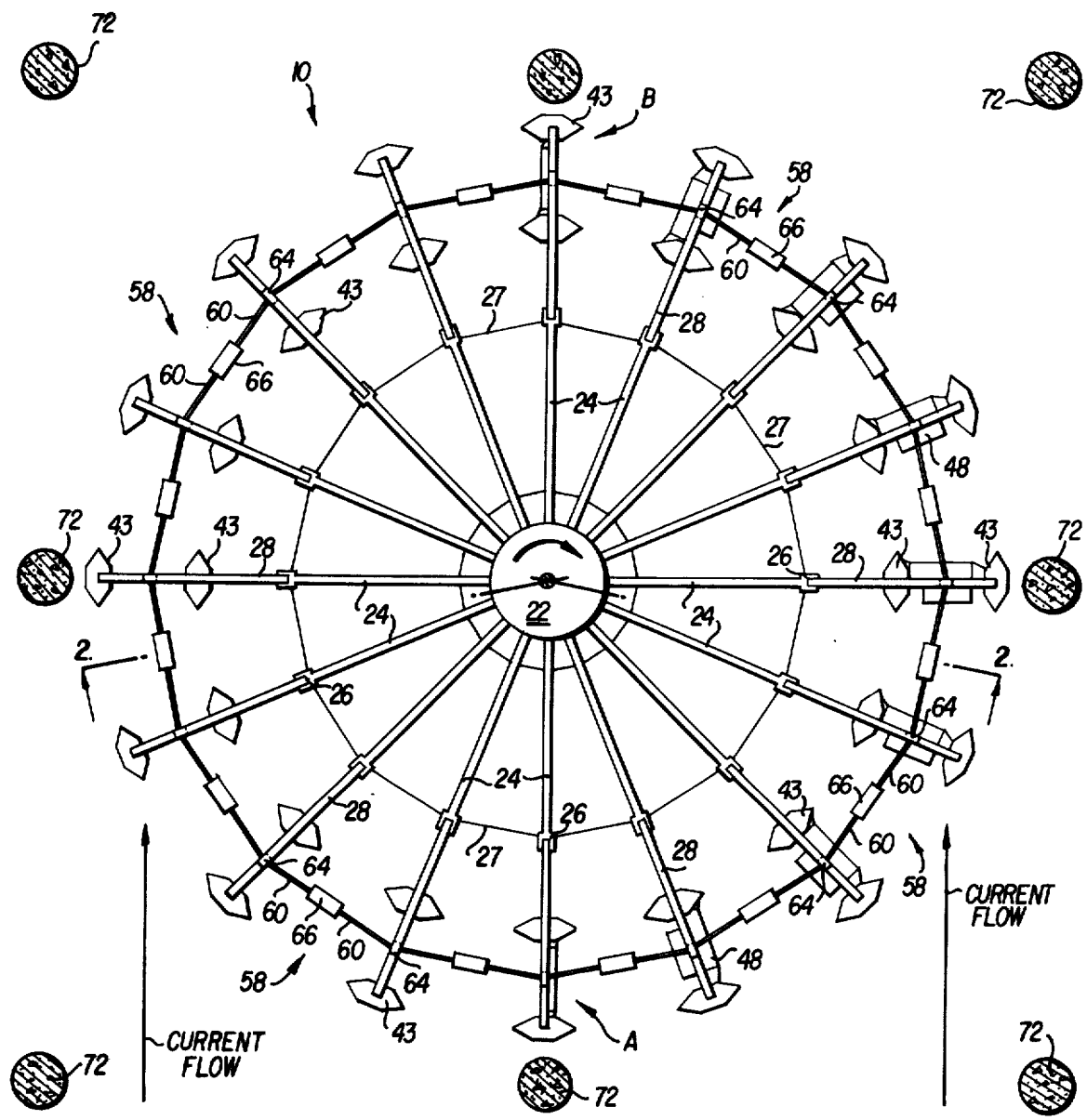
FIG. 1 is a top plan view of a fluid current motor according to the invention.
Figure 2:
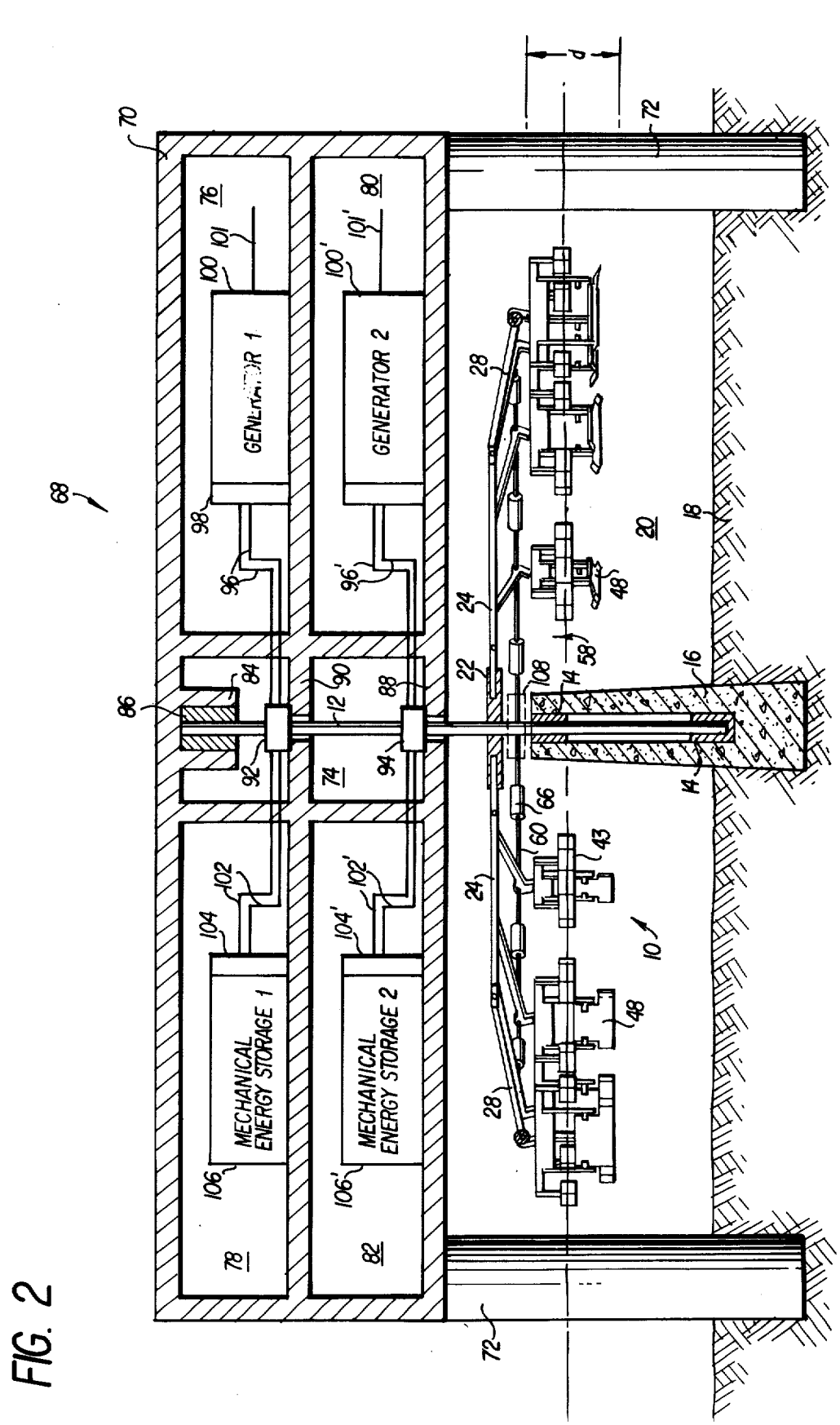
FIG. 2 is a cross-sectional view taken in the plane of line 2—2 of FIG. 1 and shows a preferred embodiment of a power take-off arrangement.

Referring now in detail to the drawings wherein like parts are designated by like reference numerals throughout, there is illustrated in FIGS. 1 and 2 a fluid current motor according to the invention which is designated generally by reference numeral 10. The fluid motor 10 includes a vertically arranged shaft 12 journaled at its lower end in spaced bearings 14 mounted in a base 16. Base 16 is embedded in the bottom or bed 18 of a body of water 20 flowing, for example, in the direction of the arrows shown in FIG. 1. Affixed to the shaft 12, well above the upper range of the rise and fall of the body of water 20, is a hub 22 from which radially extends a plurality of rigid spokes 24. At the outward extremity of each spoke 24 there is provided a knuckle 26 which hingedly receives a power transfer boom 28.

Figure 3:
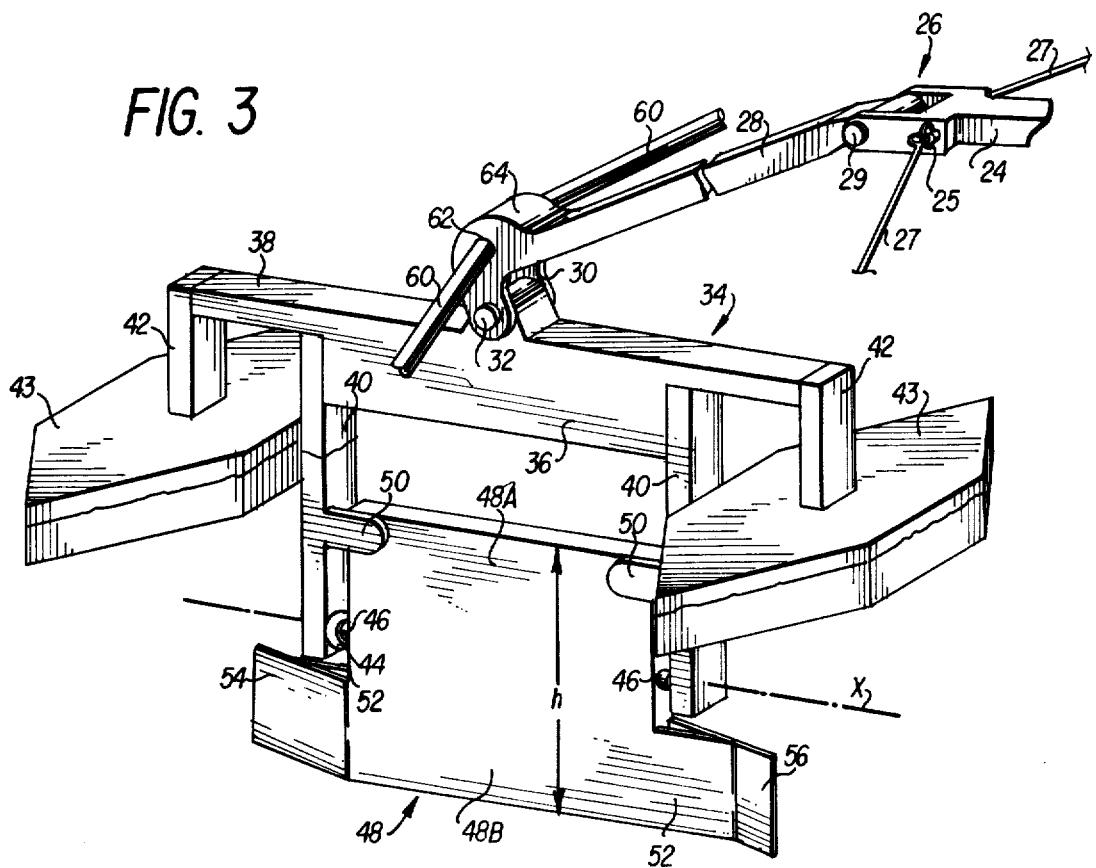
FIG. 3 is a perspective view showing a single reaction blade and yoke assembly in its operative position.

As best seen in FIG. 3, fixed spokes 24 are connected to each other at their outer extremities by strengthening members 27, such as a wire cable or the like, extending between eyes 25 welded or otherwise secured to the knuckles 26. Each power transfer boom 28 is pivotally connected to its associated spoke 24 by a pin 29 and by means of a bracket 30 and pin 32 to a respective buoyant yoke and blade assembly which is designated generally by reference numeral 34. Yoke and blade assembly 34 is shown in its operative position on the left-hand side of the fluid current motor and comprises a yoke 36 having a pair of horizontally extending members 38 and a pair of vertical arms 40 extending downwardly therefrom. At the outward extremity of the members 38 there are secured upright members 42 which are supported on floats 43 disposed at the opposite ends of the yoke 36. The arms 40 are provided with bearings 44 (only one shown) between which there are pivotally mounted shafts 46 of a fluid reaction surface or blade 48 comprising an upper portion 48A and lower portion 48B. The blade 48 is preferably of hollow construction, reinforced internally by rigid, web-like elements (not shown), and is ballasted by either a solid granular non-corrosive liquid or other suitable material to attain substantially neutral buoyancy and thus facilitate the pivoting of the blades under the force of the water current as hereinafter described. Stops 50 are also provided on the arms 40 and abut the upper portion 48A of the blade in a manner to prevent the blade from pivoting in one direction and permit the blade to pivot in the other direction. The lower portion 48B of the blade is provided with extensions 52 to which are affixed inclined surfaces 54, 56, the purpose of which will be hereinafter described.

The blade 48 is shaped substantially in the form of an inverted "T" configuration and is pivoted about a horizontal axis X extending approximately along the midpoint of the blade height $h$ or slightly above such midpoint. Thus, the sum of the forces applied by the flowing current about the axis X is approximately equal only to the force on the extensions 52 and surfaces 54, 56, the opposing forces on the blade portions 48A, 48B being substantially balanced. The stops 50, therefore, must withstand only such sum of forces and not the full force of the current as would be the case if the blade were pivoted at its upper edge. It will be appreciated by those skilled in the art that the exact positioning of the horizontal axis X along the blade height $h$ is closely related to the proportions of the working areas of the blades and the inclination angle of the hydrodynamic surfaces 54, 56. Such design parameters must be appropriately selected to actuate pivoting of the blade at an appropriate rotational position about the axis of the shaft 12 and preferably when the planar surfaces of the blade are oriented in the direction of current flow.

Referring again to FIGS. 1 and 2 it will be seen that the blades 48 on the left-hand side of the fluid motor are in their vertical or operative position and react with the flow of current to cause clockwise rotation of the fluid motor. The blades 48 on the right-hand side of the fluid motor are in their horizontal or feathered position so as not to retard the rotation of the motor. As the horizontally disposed blades on the right-hand side of the motor rotate toward the upstream station designated A in FIG. 1, the inclination of the inclined surfaces 54, 56 of the lower portion 48B of the blade is such that the flow of current applies a hydrodynamic force thereto tending to pivot the blade about axis X (FIG. 3) into its vertical or operative position. Thus, substantially simultaneously with the blade reaching station A, it will be actuated to its vertical or operative position. In a similar manner, as the vertically oriented blades 48 on the left-hand side of the motor reach the downstream station designated B in FIG. 1, the inclined surfaces 54, 56 will be oriented so that the flow of current reacts therewith in a manner to pivot the blade into its feathered or inoperative position substantially simultaneously with the blade reaching station B.

The force of the current against the vertically disposed blades on the left-hand side of the motor is transmitted via the power transfer boom 28, knuckles 26 and spokes 24 to the hub 22 to cause rotation of the shaft 12. The length of the power transfer booms 28 is selected to accommodate the full range $d$ (FIG. 2) of the rise and fall of the level of water 20. It will be apparent to those skilled in the art that the fluid current motor of the invention will operate with substantially the same effectiveness regardless of the angular orientation of the power transfer booms 28 between their horizontal or high-water position and their inclined or low-water position. In a preferred form of the invention, the power transfer booms 28 have a length about 40% greater than the range of the tide and the hub 22 is secured at a vertical position on the shaft such that at high-water the booms 28 will be approximately horizontally oriented and at low-water the booms 28 will be oriented at about a 45° inclination angle with respect to the horizontal. This maximum inclination angle of 45° is desirable to minimize the twisting force applied to the knuckle 26 and spoke 24 and, further, to avoid flow interference which could occur between closely adjacent yoke and blade assemblies if the boom 28 were vertically oriented at low-water.

To further strengthen the fluid current motor and to absorb the bending forces applied by the yoke and blade assembly 34 at the bracket 30 and pin 32, telescopic tubular members 58 are provided along the chords between the outer extremities of the booms 28. The telescopic members 58 include rigid, generally cylindrical beams 60 which are rigidly connected in sockets 62 provided in abutments 64 formed at the outer end of each boom 28 on the side thereof opposite the bracket 30. A cylindrical sleeve 66 is located at the mid-point of the each telescopic member 58 and slidably receives the ends of the beams 60. The lengthwise dimensions of the beams 60 and sleeve 66 are selected to permit sufficient extension and contraction of the telescopic members 58 to allow for the variation in chord length between adjacent booms with the rise and fall of the tide. With this telescoping arrangement, it will be appreciated that a conventional hydraulic system could be utilized in connection with the telescopic members 58 to vary the forces tending to extend and contract the members and thereby provide additional circumferential strengthening of the fluid current motor of this invention.

Referring again to FIG. 2, there is schematically shown a preferred embodiment of a power take-off arrangement designated generally by reference numeral 68 and suitable for utilizing the rotational energy imparted to the shaft 12. The arrangement 68 includes a power house or building structure 70 supported on piles 72 imbedded in the bed 18 of the body of water 20 about the periphery of the fluid current motor 10. The power house 70 is compartmentalized generally into a plurality of compartments 74, 76, 78, 80, 82. The centrally disposed compartment 74, is provided in the upper portion thereof with a bearing mount 84 and bearing 86 in which is journaled the upper end of shaft 12. Situated on the floors 88, 90 of the compartment 74 adjacent the shaft 12 are two hydraulic pumps 92, 94 which are driven by means of a suitable gearing arrangement connected to the shaft 12. The hydraulic output of the pump 92 is transmitted via hydraulic supply and return lines 96 to a hydraulic motor 98 for driving a first electrical generator 100 situated in compartment 76. The electrical output 101 of generator 100 may be transmitted via an underwater cable or the like to a suitable distribution system (not shown). In addition, the hydraulic output of the pump 92 is transmitted via hydraulic supply and return lines 102 to a hydraulic motor 104 for driving a mechanical energy storage device 106, situated in compartment 78. Such energy storage device 104 is preferably a spring motor of the type disclosed in my aforementioned copending U.S. Pat. application Ser No. 517,237, filed Oct. 23, 1974, now U.S. Pat. No. 3,945,453, the disclosure of which is incorporated herein by reference. In the lowermost compartments 80, 82 of the power house 70 there is located a back-up arrangement of power take-off components essentially identical to those housed in compartments 76, 78 and thus identified by primed designations 96' - 106'. These components may be advantageously used during periods of service and/or repair of the primary components or alternately therewith.

Each of the hydraulic pumps and motors are preferably of a type to permit reversibility of their function, that is to say, each pump may also be operated as a motor and vice versa. Thus, during periods of slack water, for example, the energy stored in mechanical energy storage device 106 may be utilized to operate hydraulic motor 104 as a pump to drive generator 100 through hydraulic lines 102, 96 and hydraulic units 92, 98. Obviously, hydraulic pump 92 could be configured in a conventional manner to merely transmit the hydraulic pressure from hydraulic unit 104 to hydraulic unit 98 without imparting rotation to the shaft 12.

Figure 4:
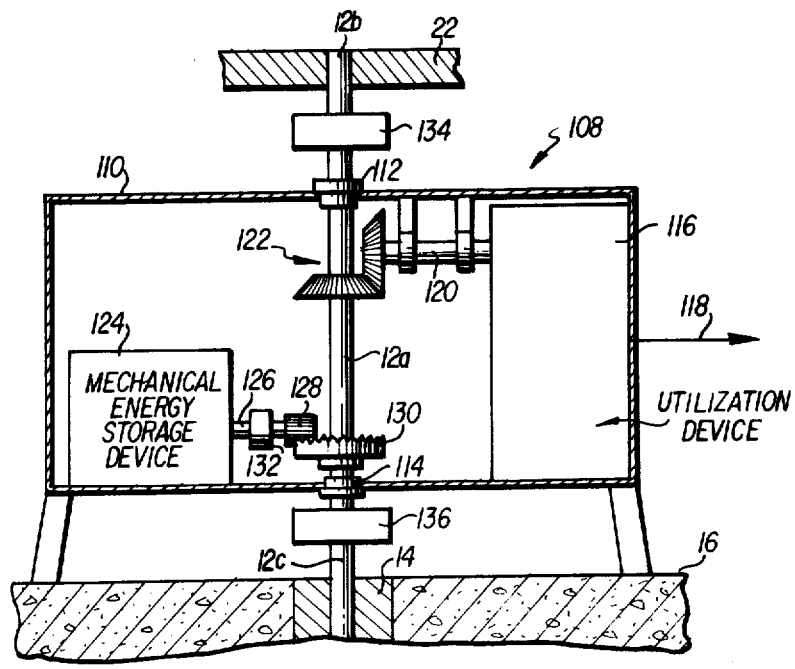
FIG. 4 is a schematic detail illustrating another embodiment of a power take-off arrangement for utilizing the rotational energy of the fluid current motor of the invention.

In FIG. 4 there is illustrated another embodiment of a power take-off arrangement designated generally by reference numeral 108. This arrangement would eliminate the need for the larger and more costly installation shown in FIG. 2 and is suitable for use with the fluid current motor of FIG. 1 as well as smaller scale versions thereof. The power take-off arrangement 108 is mounted atop the base 16 and below the hub 22 in the location shown in phantom in FIG. 2. The arrangement includes a housing 110 having upper and lower bearings 112, 114 respectively for rotatably receiving the shaft portion 12a. Interiorly of the housing 110, there is disposed a suitable utilization device 116 which may be, for example, a generator having an electrical output 118. The generator 116 is provided with a rotor shaft 120 which is connected by means of a bevel gear arrangement 122 to shaft portion 12a. Also disposed within the housing is a mechanical energy storage device 124 for storing a portion of the rotational energy generated by the fluid motor. This device 124 may also be a spring motor of the type disclosed in my aforesaid U.S. pat. No. 3,945,453.

The spring motor 124 is provided with an input shaft 126 connected to a pinion 128 which engages a gear 130 affixed to the shaft portion 12a. A suitable clutch 132 is provided on shaft 126 for automatically disengaging the input to the spring motor 124 when, for example, the spring motor is fully wound. The shaft 12 is also provided with suitable clutch mechanisms 134, 136 for disengaging the shaft portion 12a within the housing 110 from the hub 22 and shaft portion 12b and from the lower shaft portion 12c when it is desired to power the generator 116 with the spring motor 124 during, for example, periods of slack water when the motor is located in a tidal current.

In another non-illustrated arrangement of a power take-off mechanism, one or more hydraulic pumps, such as pumps 92, 94 shown in FIG. 2 and located in a housing such as housing 110 in FIG. 4 could be used to supply hydraulic power to an on-shore structure comprising the compartments 76, 78, 80, 82 of power house 70. Hydraulic supply lines 96, 96',102, 102' could be routed downwardly along base 16 and thence along the bed 18 of the body of water 20 to such on-shore structure for utilization in substantially the same manner as described above in connection with FIG. 2.

As shown in FIG. 3, construction of the yoke and blade assemblies 34 and the attachment thereof to the booms 28 is particularly suited for accomplishing replacement, service and/or repair of the assemblies. For example, when replacement of a yoke and blade assembly is desired, it is accomplished, preferably during slack water, by simply removing pin 32, floating away the old assembly and floating into position a spare assembly and securing the same to the bracket 30 by a pin 32. To prevent the outer end of the boom 28 from tilting downwardly out of position and possibly damaging the telescopic members 58 and their connections to the booms, the knuckles 26 may be provided with a stop mechanism to prevent such tilting. Alternatively, a cable could be secured between padeyes located on the abutments 64 and the underside of the power house 70 (shown in FIG. 2).

As shown in the drawings and particularly in FIG. 3, the blades 48, stops 50 and the greater portion of the arms 40 and floats 43 are maintained in a submerged condition. The tops of blades 48, for example, are preferably arranged approximately three feet below the water surface. The purpose of this arrangement is to minimize the surface area of the yoke and blade assemblies situated in the "splash zone" where the corrosive combination of oxygen in the air and the water spray is most damaging to the metal components of the assemblies.

From the foregoing description, it will be apparent that the fluid current motor of the present invention provides a particularly simple and effective means for extracting large amounts of energy from natural water currents and especially from tidal currents. Moreover, the fluid motor is capable of providing a substantially unattended and continuous source of energy. The specific details of construction of the various elements of the fluid motor of the present invention not described herein are considered well within the capabilities of those skilled in the art and, therefore, need not be further described.

Although only a preferred embodiment is specifically illustrated and described herein, it will be appreciated that many modificiations and variations of the present invention are possible in light of the above teachings and within the purview of the appended claims without departing from the spirit and intended scope of the invention. For example, the inclined hydrodynamic surfaces of the blades may be configured in curvilinear fashion and, if desired, the blades may be of open top and bottom construction or enclosed and hydrodynamically shaped to minimize the resistance to flow when the blades are in their feathered position. Likewise, the normally submerged portions of the yoke assembly and floats may be appropriately configured to minimize their resistance to the rotational force imparted to the fluid motor output shaft.

What is claimed is:

1. A fluid current motor comprising:
 a base;
 a vertical shaft supported by said base;
 a hub mounted on said shaft and rotatable about the axis thereof;
 a plurality of spokes extending radially from said hub; and
 a plurality of fluid reaction blades each having a first fluid reaction surface and mounted adjacent the end of a respective spoke, each blade being pivotable between a substantially vertical position wherein a fluid current imparts a force to the blade to rotate said hub and a substantially horizontal position wherein the fluid current imparts substantially no force to the blade, each blade further including means for hydrodynamically urging the blade between its vertical and horizontal positions when the first fluid reaction surface thereof is oriented substantially in the direction of flow of the fluid current.

2. Apparatus according to claim 1, wherein said urging means for each blade includes a second reaction surface arranged at an inclination with respect to the first fluid reaction surface to urge the blade associated therewith:
 1. from its vertical position to its horizontal position when said associated blade is oriented substantially in the direction of fluid current flow on the downstream side of said motor, and
 2. from its horizontal position to its vertical position when said associated blade is oriented substantially in the direction of fluid current flow on the upstream side of said motor.

3. Apparatus according to claim 1, including power take-off means connected to said shaft, said power take-off means including spring motor means for storing at least a portion of the energy generated by said fluid motor.

4. Apparatus according to claim 3 wherein said power take-off means includes a hydraulic pump operatively connected to said shaft, said hydraulic pump being operatively connected to an electrical generator and to said spring motor means.

5. Apparatus according to claim 1, including a yoke pivotally mounted to the end of each spoke, said yoke having a pair of spaced arms for pivotally mounting the fluid reaction blade associated therewith, said yoke being connected to and supported above the surface of the fluid current by at least one buoyant member.

6. Apparatus according to claim 1, wherein each of said spokes includes an inner section and an outer section, means hingedly connecting said inner and outer sections, and including buoyant members connected with said fluid reaction blades for automatically adjusting the position of the fluid reaction blades to the rise and fall of the fluid current surface.

7. Apparatus according to claim 6 wherein the outward extremities of the outer sections of adjacent spokes are interconnected by a plurality of telescopic means for minimizing the twisting of said outer sections about the longitudinal axes thereof.

8. Apparatus according to claim 7 wherein each of said telescopic means includes beams affixed to the outward extremity of adjacent outer sections and extending substantially along a chord therebetween and a sleeve means positioned intermediately of said adjacent outer sections for slidably receiving said beams.

9. Apparatus according to claim 6, wherein the length of said outer section is greater than the difference between the mean high and low points of the rise and fall of the fluid current surface such that the downward inclination of said outer section is limited to approximately 45°.

10. Apparatus according to claim 1, including stop means associated with each fluid reaction blade for engaging such blade when it is pivoted into its vertical position.

11. Apparatus according to claim 1, wherein each fluid reaction blade is pivotable about a horizontal axis substantially aligned with the mid-point of its vertical height.

12. Apparatus according to claim 11, wherein the fluid reaction blades are each shaped substantially in the form of an inverted T.

13. Apparatus according to claim 1, wherein said fluid reaction blades are of hollow construction.

14. Apparatus according to claim 1 wherein said fluid reaction blades are substantially neutrally buoyant.

* * * * *